United States Patent
Miller et al.

(10) Patent No.: US 9,827,955 B2
(45) Date of Patent: Nov. 28, 2017

(54) SYSTEMS AND METHODS TO IMPROVE FUEL ECONOMY USING ADAPTIVE CRUISE IN A HYBRID ELECTRIC VEHICLE WHEN APPROACHING TRAFFIC LIGHTS

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 14/640,334

(22) Filed: Mar. 6, 2015

(65) Prior Publication Data
US 2016/0257288 A1    Sep. 8, 2016

(51) Int. Cl.
| | |
|---|---|
| *B60W 10/18* | (2012.01) |
| *B60W 30/16* | (2012.01) |
| *B60T 8/17* | (2006.01) |
| *B60W 20/00* | (2016.01) |
| *B60L 7/12* | (2006.01) |
| *B60L 7/18* | (2006.01) |
| *B60T 1/10* | (2006.01) |
| *B60T 7/22* | (2006.01) |
| *F16D 61/00* | (2006.01) |

(Continued)

(52) U.S. Cl.
CPC .................. *B60T 8/17* (2013.01); *B60L 7/12* (2013.01); *B60L 7/18* (2013.01); *B60L 15/10* (2013.01); *B60L 15/20* (2013.01); *B60L 15/2009* (2013.01); *B60T 1/10* (2013.01); *B60T 7/22* (2013.01); *B60W 20/00* (2013.01); *F16D 61/00* (2013.01); *B60T 2201/02* (2013.01); *B60T 2270/604* (2013.01); *B60W 10/18* (2013.01); *B60W 30/16* (2013.01); *B60W 2550/22* (2013.01); *B60W 2710/18* (2013.01); *Y02T 10/645* (2013.01); *Y02T 10/72* (2013.01); *Y02T 10/7275* (2013.01); *Y10S 903/947* (2013.01)

(58) Field of Classification Search
None
See application file for complete search history.

(56) References Cited

U.S. PATENT DOCUMENTS

| | | |
|---|---|---|
| 7,703,563 B2 | 4/2010 | Aldrich, III et al. |
| 8,543,273 B2 | 9/2013 | Pfefferl |
| (Continued) | | |

FOREIGN PATENT DOCUMENTS

| WO | WO 2009096882 A1 * | 8/2009 | ............... B60T 7/18 |
|---|---|---|---|

*Primary Examiner* — Thomas G Black
*Assistant Examiner* — Demetra Smith-Stewart
(74) *Attorney, Agent, or Firm* — David Kelley; Brooks Kushman, P.C.

(57) ABSTRACT

A method for controlling a vehicle includes automatically controlling vehicle brakes to decelerate the vehicle at a braking deceleration rate in response to an anticipated stop at a traffic signal and an adaptive cruise control system being active. The method further includes, in response to the vehicle decelerating to an intermediate speed, releasing the vehicle brakes. The intermediate speed is determined such that, at the intermediate speed, a coasting distance to a full stop is approximately equal to a distance to the traffic signal.

13 Claims, 3 Drawing Sheets

(51) Int. Cl.
  *B60L 15/10*  (2006.01)
  *B60L 15/20*  (2006.01)

(56) References Cited

U.S. PATENT DOCUMENTS

| | | | |
|---|---|---|---|
| 8,731,788 B2* | 5/2014 | Sujan | B60W 50/0097 180/169 |
| 9,278,680 B2* | 3/2016 | Seguchi | B60W 10/06 |
| 9,327,730 B2* | 5/2016 | Miller | B60W 10/18 |
| 9,533,669 B2* | 1/2017 | Kono | B60W 10/02 |
| 2005/0010352 A1 | 1/2005 | Michi et al. | |
| 2007/0173372 A1* | 7/2007 | Ueno | B60W 30/18072 477/3 |
| 2010/0004839 A1* | 1/2010 | Yokoyama | G08G 1/052 701/70 |
| 2011/0307122 A1* | 12/2011 | Kanning | B60W 30/18072 701/1 |
| 2012/0078466 A1* | 3/2012 | Natori | B60Q 1/52 701/36 |
| 2012/0139329 A1* | 6/2012 | Fabini | B60L 7/10 303/3 |
| 2012/0319465 A1* | 12/2012 | Koyama | B60T 1/10 303/3 |
| 2013/0297124 A1* | 11/2013 | Be | G06F 17/00 701/22 |
| 2013/0297134 A1* | 11/2013 | Saito | B60L 7/18 701/22 |
| 2014/0277986 A1 | 9/2014 | Mahler et al. | |
| 2014/0335994 A1* | 11/2014 | Otake | B60W 10/06 477/3 |
| 2015/0070195 A1* | 3/2015 | Gaines | G08G 1/0967 340/932 |
| 2015/0183433 A1* | 7/2015 | Suzuki | B60W 30/16 701/96 |
| 2015/0258984 A1* | 9/2015 | Atluri | B60W 10/06 701/22 |
| 2015/0298680 A1* | 10/2015 | Matthews | B60W 20/00 701/22 |
| 2016/0061611 A1* | 3/2016 | Meyer | G01C 21/3469 701/1 |

* cited by examiner

SYSTEMS AND METHODS TO IMPROVE FUEL ECONOMY USING ADAPTIVE CRUISE IN A HYBRID ELECTRIC VEHICLE WHEN APPROACHING TRAFFIC LIGHTS

TECHNICAL FIELD

This disclosure relates to systems and methods for controlling the operation of an adaptive cruise control system in a vehicle equipped for regenerative braking.

BACKGROUND

Adaptive Cruise Control (ACC) systems use an on-board sensor (usually RADAR or LIDAR) to detect the distance between the host vehicle and a vehicle ahead of the host (the lead vehicle), and the relative speed difference between the vehicles. The system then automatically adjusts the speed of the host vehicle to keep it at a pre-set distance behind the lead vehicle, even in most fog and rain conditions. Typically, the host vehicle driver can set a desired/minimum following distance and/or a time gap to be maintained between vehicles. The ACC generates automatic interventions in the powertrain and/or braking systems of the host vehicle to slow the host vehicle as necessary to maintain the selected minimum following distance. Some ACC systems are also configured to generate automatic interventions in the powertrain and/or braking systems of the host vehicle to slow the host vehicle in response to a detected traffic signal, such as a traffic light or stop sign.

SUMMARY

A method for controlling a vehicle according to the present disclosure includes automatically controlling vehicle brakes to decelerate the vehicle at a braking deceleration rate. The automatic control is in response to an anticipated stop at a traffic signal and an adaptive cruise control system being active. The method further includes, in response to the vehicle decelerating to an intermediate speed, releasing the vehicle brakes. The intermediate speed is determined such that, at the intermediate speed, a coasting distance to a full stop is approximately equal to a distance to the traffic signal.

In some embodiments, the braking deceleration rate is the least of a calculated comfortable deceleration rate limit, a calculated permissible deceleration rate limit, and a regenerative braking deceleration rate associated with a regenerative braking limit. Some embodiments further include, in response to the traffic signal being a traffic light and the traffic light turning green while the vehicle brakes are automatically controlled, releasing the vehicle brakes.

A vehicle according to the present disclosure includes traction wheels, a regenerative braking system, and a controller. The controller is configured to, in response to an anticipated stop, control the regenerative braking system to decelerate the wheels at a first deceleration rate. The ACC system is further configured to, in response to the wheels being decelerated to an intermediate speed, control the regenerative braking system to decelerate the wheels at a second deceleration rate. The second deceleration rate is less than the first deceleration rate. The first deceleration rate may be the least of a calculated comfortable deceleration rate limit, a calculated permissible deceleration rate limit, and a regenerative braking limit. The second deceleration rate may be a coasting deceleration rate. The anticipated stop may be detected in response to a detected traffic signal. In some embodiments, the ACC system is further configured to, in response to the traffic signal being a traffic light and the traffic light turning green while the controller is controlling the regenerative braking system to decelerate the wheels, deactivate the regenerative braking system.

A method of controlling a vehicle according to the present disclosure includes automatically controlling regenerative brakes to decelerate the vehicle from an initial speed at a braking deceleration rate in response to an anticipated stop at a traffic signal and an adaptive cruise control system being active. The method further includes controlling the regenerative brakes to decelerate the vehicle at a coasting deceleration rate in response to a coasting distance at a current vehicle speed being approximately equal to a distance to the traffic signal. The magnitude of the braking deceleration rate may be greater than the magnitude of the coasting deceleration rate.

Embodiments according to the present disclosure provide a number of advantages. For example, embodiments according to the present disclosure reduce time spent at relatively high vehicle speeds during a deceleration event, thus reducing aerodynamic drag losses. In addition, embodiments according to the present disclosure increase the likelihood that the host vehicle will not come to a full stop at a red light, thus reducing energy consumption for re-accelerating the vehicle to cruising speed.

The above and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Adaptive Cruise Control (ACC) refers to a control method for automatically controlling a host vehicle, including maintaining both a desired speed and a permissible distance from forward vehicles in the lane of travel. A host vehicle equipped with ACC is configured to maintain at least a predefined distance from a target vehicle positioned forward of the host vehicle. An ACC system generally includes at least one sensor, such as RADAR, LIDAR, ultrasonics, or other sensors or combination thereof. The ACC system is configured to directly or indirectly control throttle and brake systems to control host vehicle acceleration and deceleration according to an ACC algorithm.

Some vehicles equipped with ACC systems may also include powertrains equipped for regenerative braking. Regenerative braking refers to the recapture and storage of vehicle kinetic energy for subsequent use by the vehicle. Regenerative braking systems generally include an electric machine or motor/generator configured to apply braking torque to vehicle traction wheels and generate electric power. Other systems may include accumulators, flywheels, or other mechanisms for storing energy for subsequent use.

Figure 1:
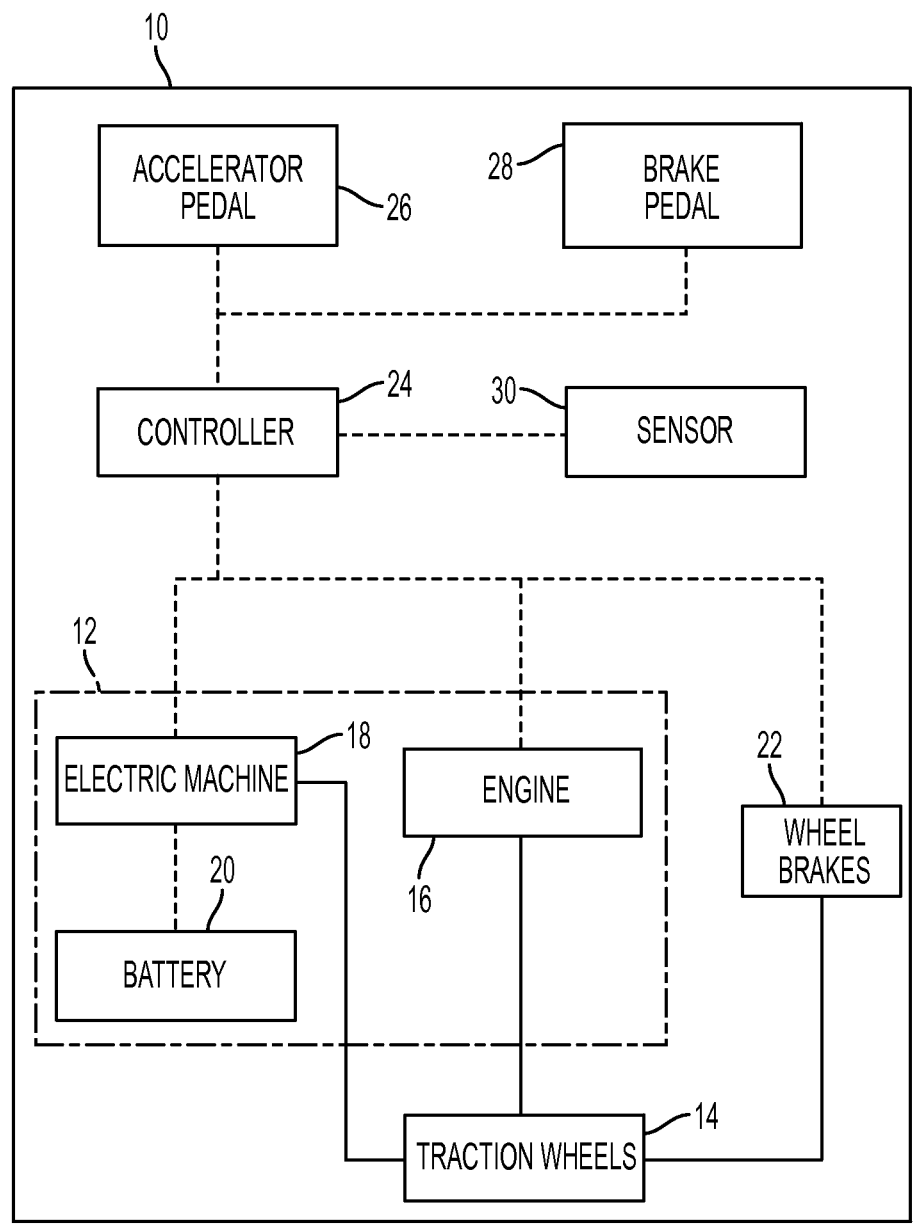
FIG. 1 is a schematic representation of a vehicle according to the present disclosure.

Referring now to FIG. 1, a host vehicle 10 according to the present disclosure is illustrated in schematic form. The host vehicle 10 includes a hybrid powertrain 12 configured to deliver power to traction wheels 14. The hybrid powertrain 12 includes an internal combustion engine 16 and at least one electric machine 18, each configured to deliver power to the vehicle traction wheels. The electric machine 18 is electrically coupled to a battery 20. In various embodiments, the powertrain 12 may be arranged as a series, parallel, or series-parallel powertrain.

The electric machine 18 is also configured to provide regenerative braking torque to the traction wheels 14, in which rotational energy from the traction wheels 14 is converted to electrical energy. Electrical energy generated by the electric machine 18 may be stored in the battery 20 for subsequent use by the host vehicle 10.

The host vehicle 10 additionally includes wheel brakes 22, which may be referred to as friction brakes, configured to provide friction braking torque to the traction wheels 14.

The electric machine 18, engine 16, and wheel brakes 22 are all in communication with or under the control of at least one controller 24. Although illustrated as a single controller, the controller 24 may be part of a larger control system and/or may be controlled by various other controllers throughout the host vehicle 10. In one embodiment, the controller 24 is a powertrain control unit (PCU) under the control of a vehicle system controller (VSC). The controller 24 and one or more other controllers can collectively be referred to as a "controller." The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The host vehicle 10 additionally includes an accelerator pedal 26 and a brake pedal 28. In response to a driver actuation of the accelerator pedal 26, the controller 24 is configured to coordinate the electric machine 18 and engine 16 to provide power to the traction wheels 14. In response to a driver actuation of the brake pedal 28, the controller 24 is configured to control the electric machine 18 and/or wheel brakes 22 to provide braking torque to the traction wheels 14.

Regenerative braking systems generally have a powertrain braking power limit and a powertrain braking torque limit. Generally speaking, the power limit is a function of battery limits, such as a maximum battery charge rate, while the torque limit is a function of motor torque limits. The powertrain braking torque and power limits refer to maximum amounts of braking torque and power, respectively, that the system is capable of applying to traction wheels under current operating conditions. In typical regenerative braking systems including an electric machine acting as a generator, the regenerative braking torque and power limits are generally based on motor torque capabilities, battery energy delivery limits (e.g. a battery state of charge), current gear in embodiments having a step-ratio transmission, and other powertrain limits. It should be noted that at a given vehicle speed, the regenerative braking power limit can be divided by the current wheel speed to obtain a regenerative braking torque limit.

In response to a brake request that does not exceed the regenerative braking torque limit, the controller 24 is configured to control the electric machine 18 to provide regenerative braking torque to satisfy the braking request. In response to a braking request that does exceed the regenerative braking torque limit, the controller 24 is configured to control the electric machine 18 and wheel friction brakes 22 to satisfy the braking request.

The host vehicle 10 further includes at least one sensor 30. The sensor 30 may include RADAR, LIDAR, ultrasonic sensors, optical camera, or other sensors or a combination thereof. The sensor 30 is configured to detect objects forward of the host vehicle 10. In particular, the sensor 30 is oriented to detect a vehicle forward and in a same driving lane as the host vehicle 10.

The controller 24 is configured to control the host vehicle acceleration and braking according to an ACC algorithm in response to detection of a forward vehicle via the sensor 30. This may include coordinating the engine 16 and/or electric machine 18 to satisfy an ACC acceleration request. This may additionally include coordinating the engine 16, electric machine 18, and/or wheel brakes 22 to satisfy an ACC deceleration request. Generally speaking, the ACC algorithm is configured to automatically adjust speed of the host vehicle 10 to maintain a pre-set distance behind a detected forward vehicle based on a detected distance to and speed of the forward vehicle. In some variants, the host vehicle driver may set a desired/minimum following distance and/or a time gap to be maintained between vehicles.

Similarly, the ACC algorithm may be configured to automatically adjust speed of the host vehicle in response to detection of a traffic signal, such as a stop sign or stop light. The algorithm may be configured to automatically decelerate the host vehicle in response to a detected traffic signal such that the host vehicle attains a full stop at the traffic signal.

Figure 2A:
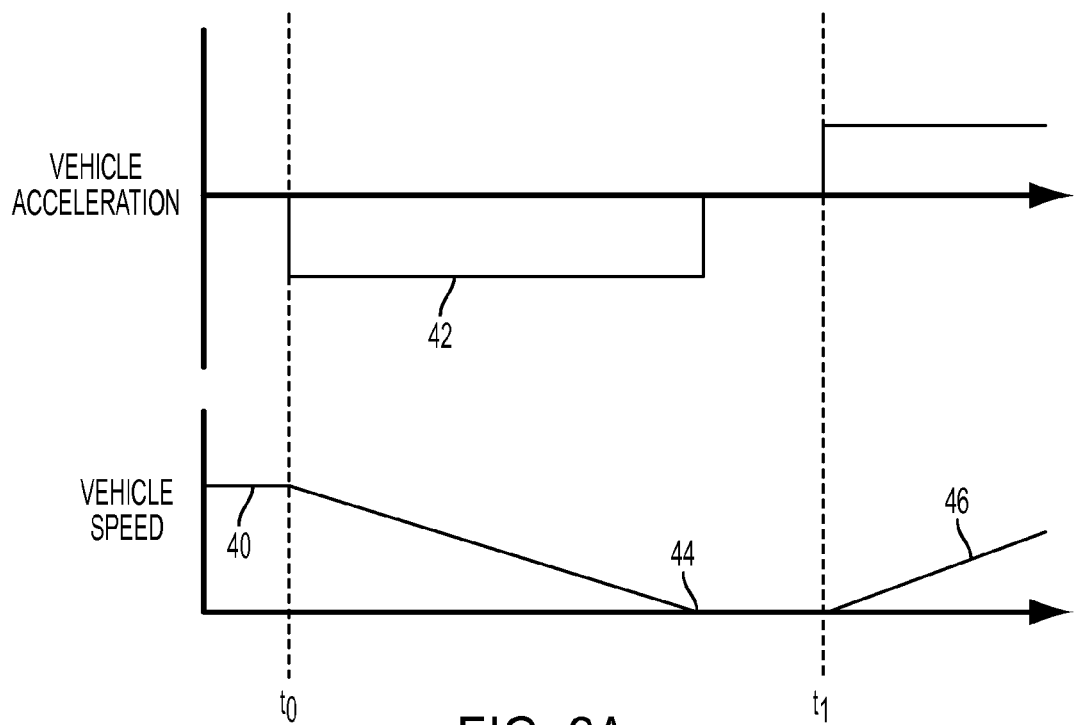
FIG. 2A illustrates a vehicle acceleration and braking event according to the prior art.

Referring now to FIG. 2A, an example braking and acceleration event according to known ACC systems is illustrated. A host vehicle is in motion at an initial speed, as illustrated at 40. In this illustrative example the initial speed is generally constant (i.e. approximately zero acceleration). At time $t_0$, a traffic signal is detected. In this example, the traffic signal is a traffic light. Vehicle brakes are applied to decelerate the host vehicle at a generally constant rate, as illustrated at 42. The host vehicle comes to a full stop, as illustrated at 44. At time $t_1$, the traffic light turns green, and the host vehicle accelerates away from the full stop, as illustrated at 46.

While such known ACC algorithms may stop a host vehicle at a traffic signal without driver intervention, constant vehicle deceleration may result in sub-optimal fuel efficiency. Because aerodynamic drag varies with the square of velocity, time spent at high vehicle speeds results in an increase in energy lost to wind resistance. While experienced by all vehicles, these losses may be particularly notable in hybrid vehicles due to the reduction in potential energy recapturable through regenerative braking.

Fuel efficiency may also be detrimentally impacted if the host vehicle arrives at a traffic light too soon. If the vehicle comes to a near stop or full stop at a traffic signal rather than rolling through an intersection, additional energy must be used to re-accelerate the vehicle after the stop. Furthermore, at low speeds, regenerative braking may consume more energy than is recaptured due to inherent motor inefficiency at very low rotational speeds. Thus, below a threshold speed, regenerative braking may be reduced and friction braking increased. As an example, this threshold speed may be approximately 10 miles per hour. It is therefore desirable to avoid decelerating the vehicle below the threshold speed, if possible, to maximized recaptured kinetic energy.

Figure 2B:
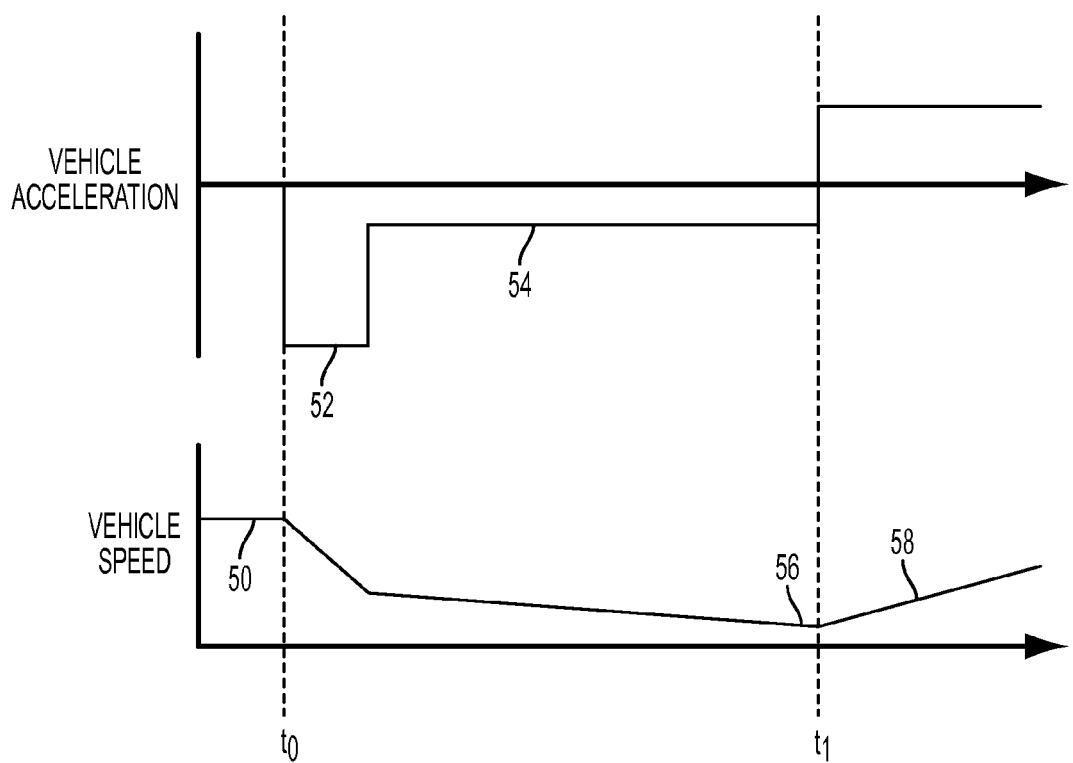
FIG. 2B illustrates an exemplary vehicle acceleration and braking events according to the present disclosure.

Referring now to FIG. 2B, an example braking and acceleration event according to the present disclosure is illustrated. A host vehicle is in motion at an initial speed, as illustrated at 50. In this illustrative example the initial speed is generally constant (i.e. approximately zero acceleration). At time $t_0$, a traffic signal is detected. In this example, as in FIG. 2A, the traffic signal is a traffic light. In response to the detected traffic signal, a stop is anticipated. In response to the anticipated stop, the ACC system initially decelerates the host vehicle at a relatively high rate when compared to the prior art, as illustrated at 52. The initial deceleration rate is an optimized deceleration rate determined based on regenerative braking limits, road conditions, and passenger comfort, as will be discussed in greater detail below. The initial deceleration is maintained until a coasting distance at a current vehicle speed is generally equal to a distance to the traffic signal, as will also be discussed in further detail below. After the initial deceleration, the ACC system allows the host vehicle to coast toward the traffic signal, as illustrated at 54. At time $t_1$, when the traffic light turns green, the host vehicle is still coasting toward the traffic light, as illustrated at 56. The host vehicle then accelerates away, as illustrated at 58.

Figure 3:
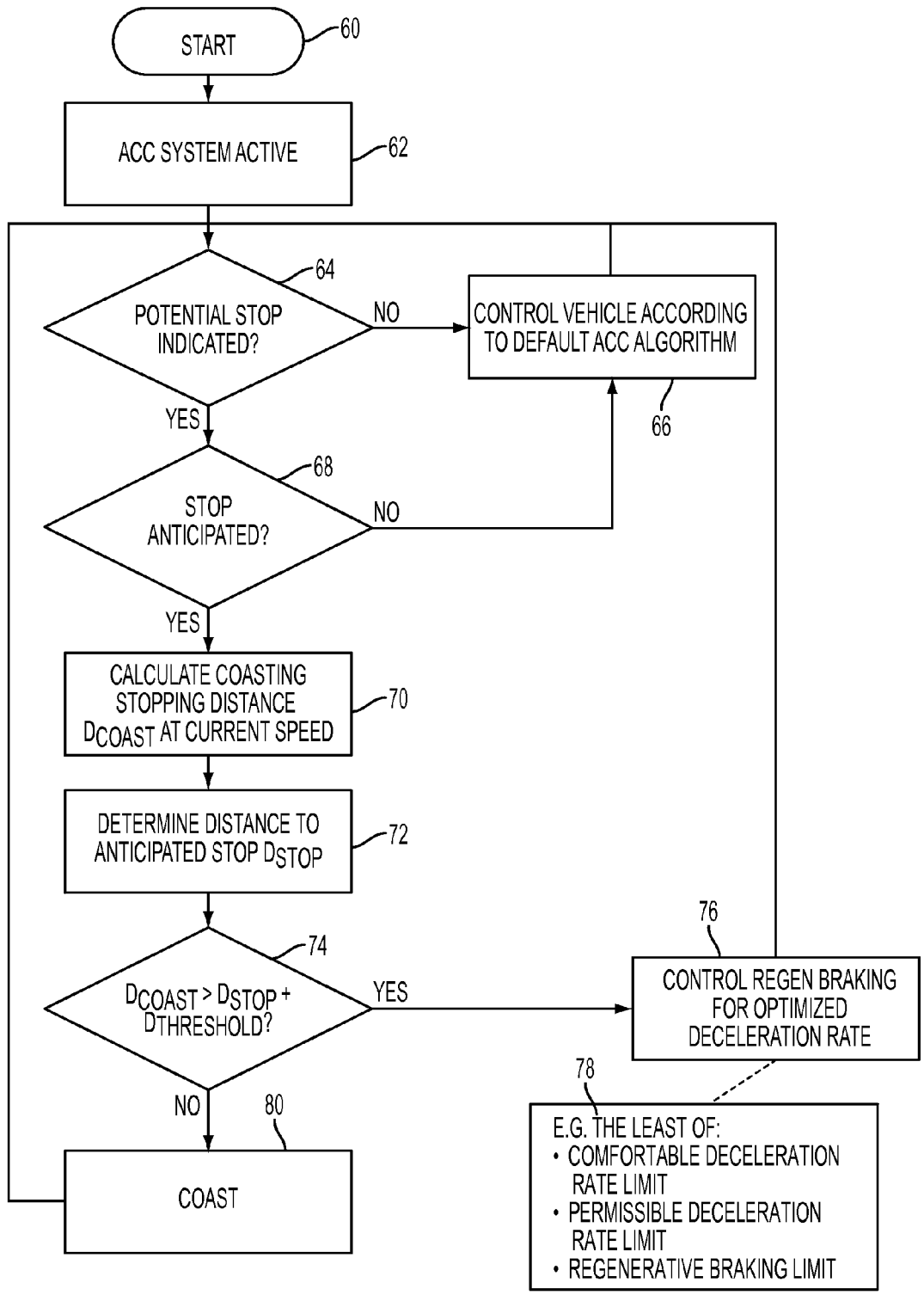
FIG. 3 illustrates a method of controlling a vehicle according to the present disclosure in flowchart form.

Referring now to FIG. 3, an ACC algorithm for controlling vehicle braking and acceleration is illustrated in flowchart form. The algorithm begins at block 60. The ACC system is active, as illustrated at block 62. A determination is then made of whether a potential stop is indicated, as illustrated at operation 64. A potential stop may be indicated, for example, based on a detected traffic signal, such as a stop light or stop sign. A potential stop may also be indicated based on a detected obstruction in the road, such as a stopped vehicle or road debris. Such detections may be performed, for example, using optical detection of the traffic signal or road obstruction. In addition, some "smart" traffic signals are configured to broadcast traffic signal status such as traffic light timing information. The determination of whether a potential stop is indicated may thus also be performed based on receiving signal status information from a smart traffic signal.

If a potential stop is not indicated, the host vehicle is controlled according to the default ACC algorithm, as illustrated at block 66. This may include automatically adjusting the speed of the host vehicle to keep it at a pre-set distance behind a forward vehicle, if one is present. Control then returns to operation 64.

If a potential stop is indicated, a determination is made of whether a stop is anticipated at the potential stop, as illustrated at operation 68. As examples, a stop may generally be anticipated in response to the potential stop being a road obstruction, a stop sign, or a red traffic light. As another example, a stop may not be anticipated in response to the potential stop being a green traffic light, or a smart traffic light when the transmitted timing information indicates that the traffic light will turn green prior to the host vehicle arriving at the intersection.

If a stop is not anticipated, the host vehicle is controlled according to the default ACC algorithm, as illustrated at block 66. Control then returns to operation 64.

If a stop is anticipated, the coasting stopping distance $D_{coast}$ is calculated for a current vehicle speed, as illustrated at block 70. $D_{coast}$ corresponds to the distance the vehicle will coast before coming to a full stop, and may be based on factors including, but not limited to, the deceleration rate at a current road grade, host vehicle mass, and current vehicle speed. If the host vehicle is configured to apply a quantity of "lift pedal" regenerative braking torque when neither the brake nor accelerator pedal are applied, $D_{coast}$ may also be based on the amount of lift pedal regenerative braking torque.

The distance to the anticipated stop, $D_{stop}$, is also determined and stored, as illustrated at block 72. This may be performed, for example, based on readings from RADAR, LIDAR, or other appropriate sensors as discussed above with respect to FIG. 1.

A determination is then made of whether $D_{coast}$ exceeds the sum of $D_{stop}$ and a calibratable distance threshold $D_{threshold}$, as illustrated at block 74. In other words, a determination is made of whether the coasting distance before the vehicle comes to a full stop is greater than the distance to the anticipated stop plus an additional distance threshold. The calibratable distance threshold $D_{threshold}$ is preferably a small non-zero value such that, if permitted to coast to the anticipated stop, the vehicle would have a small non-zero vehicle speed when approaching the stop.

If yes, then the ACC algorithm controls the host vehicle regenerative braking system to slow the host vehicle at an optimized deceleration rate, as illustrated at block 76. The optimized deceleration rate is preferably higher than the constant rate implemented in known systems. In one embodiment, the optimized deceleration rate is selected as the least magnitude of a comfortable deceleration rate limit, a permissible deceleration rate limit based on road conditions, and a regenerative braking limit, as illustrated at block 78. The optimized deceleration rate thus balances driver comfort, vehicle stability, and regenerative braking limits.

In one embodiment, the comfortable deceleration rate limit is a constant selected based on driver comfort. In other embodiments, the comfortable deceleration rate is obtained from a lookup table as a function of current vehicle speed.

In some embodiments, the permissible deceleration limit is obtained from a fraction control system controller. The permissible deceleration limit may be a function of a maximum allowable braking rate and vehicle turning forces.

The regenerative braking limit may be based on current vehicle operating conditions. In some embodiments, the regenerative braking limit is a function of a current battery state of charge and powertrain braking limits.

The algorithm then returns to operation 64. Thus, so long as a stop is anticipated, the host vehicle is decelerated at an optimized rate until the coasting distance falls below or equal to the sum of $D_{stop}$, the distance to the anticipated stop, and $D_{threshold}$, the calibratable distance threshold.

If no, meaning the coasting distance is less than or equal to the sum of $D_{stop}$ and $D_{threshold}$, then the ACC algorithm controls the host vehicle brakes to permit the vehicle to coast, as illustrated at block 80. The algorithm then returns to operation 64. Thus, the system continues to monitor whether a stop is anticipated. If a stop is no longer anticipated, e.g. a traffic light turns green, coasting ceases and the host vehicle is controlled according to the default ACC algorithm.

Variations of the above are, of course, possible. As an example, embodiments according to the present disclosure may be implemented in a vehicle that is not equipped for regenerative braking. Such vehicles may also see fuel economy gains due to decreased time spent at high speeds prior to an anticipated stop. As another example, embodiments according to the present disclosure may be implemented in conjunction with a controller in a fully automated vehicle, rather than in conjunction with a traditionally-driven vehicle provided with an ACC algorithm.

As can be seen from the various embodiments, the present invention provides a system and method for automatically controlling vehicle brakes to reduce time spent at relatively high vehicle speeds during a deceleration event, thus reducing aerodynamic drag losses. In addition, embodiments according to the present disclosure increase the likelihood that the host vehicle will not come to a full stop at a red light, thus reducing energy consumption for re-accelerating the vehicle to cruising speed. Furthermore, systems and methods according to the present disclosure may reduce time spent at vehicle speeds in ranges where regenerative braking is unavailable.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle, comprising:
   in response to an anticipated stop at a traffic signal, automatically controlling vehicle brakes to decelerate the vehicle at a braking deceleration rate;
   in response to the vehicle decelerating to an intermediate speed, releasing the vehicle brakes, wherein at the intermediate speed a coasting distance to a full stop is approximately equal to a distance to the traffic signal; and
   in response to the traffic signal being a traffic light and the traffic light turning green while the vehicle brakes are automatically controlled, releasing the vehicle brakes.

2. The method of claim 1, wherein at the intermediate speed the coasting distance to a full stop is equal to a sum of the distance to the traffic signal and a calibratable distance threshold.

3. The method of claim 1, wherein the braking deceleration rate is the least of a calculated comfortable deceleration rate limit, a calculated permissible deceleration rate limit, and a regenerative braking deceleration rate associated with a regenerative braking limit.

4. A vehicle comprising:
   traction wheels;
   a regenerative braking system; and
   a controller configured to, in response to an anticipated stop, control the regenerative braking system to decelerate the wheels at a first deceleration rate, and in response to the wheels being decelerated to an intermediate speed at the first deceleration rate, control the regenerative braking system to decelerate the wheels at a second deceleration rate less than the first deceleration rate.

5. The vehicle of claim 4, wherein at the intermediate speed a coasting distance to a full stop is equal to or less than a sum of a distance to the anticipated stop and a calibratable distance threshold.

6. The vehicle of claim 4, wherein the first deceleration rate is the least of a calculated comfortable deceleration rate limit, a calculated permissible deceleration rate limit, and a regenerative braking deceleration rate associated with a limit of the regenerative braking system.

7. The vehicle of claim 4, wherein the second deceleration rate is a coasting deceleration rate.

8. The vehicle of claim 4, wherein the anticipated stop is based on a detected traffic signal.

9. The vehicle of claim 8, wherein the controller is further configured to, in response to the detected traffic signal being a traffic light and the traffic light turning green while the controller is controlling the regenerative braking system to decelerate the wheels, deactivate the regenerative braking system.

10. A vehicle comprising:
    an adaptive cruise control system;
    a regenerative braking system; and
    a controller configured to:
       in response to an anticipated stop at a traffic signal and the adaptive cruise control system being active, automatically control the regenerative brakes to decelerate the vehicle at a braking deceleration rate, and
       in response to the vehicle decelerating to a speed having a coasting distance approximately equal to a distance to the traffic signal, deactivate the regenerative brakes to decelerate the vehicle at a coasting deceleration rate.

11. The vehicle of claim 10, wherein the braking deceleration rate is the least of a calculated comfortable deceleration rate limit, a calculated permissible deceleration rate limit, and a regenerative braking deceleration rate associated with a limit of the regenerative brakes.

12. The vehicle of claim 10, further comprising in response to the traffic signal being a traffic light and the traffic light turning green while the regenerative brakes are automatically controlled, automatically deactivating the regenerative brakes.

13. The vehicle of claim 10, wherein a magnitude of the braking deceleration rate is greater than a magnitude of the coasting deceleration rate.

* * * * *